(12) United States Patent
Kobayakawa

(10) Patent No.: US 7,497,112 B2
(45) Date of Patent: Mar. 3, 2009

(54) METHOD FOR ESTIMATING A TIRE RUNNING CONDITION AND AN APPARATUS FOR EFFECTING THE METHOD AND A TIRE WITH SENSORS DISPOSED THEREIN

(75) Inventor: Akira Kobayakawa, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 23 days.

(21) Appl. No.: 11/751,791

(22) Filed: May 22, 2007

(65) Prior Publication Data

US 2007/0295074 A1    Dec. 27, 2007

(30) Foreign Application Priority Data

Jun. 16, 2006    (JP) .............................. 2006-167700

(51) Int. Cl.
*G01M 17/02* (2006.01)
(52) U.S. Cl. .................... 73/146; 73/146.3; 73/146.5
(58) Field of Classification Search ........ 73/146–146.8; 340/442–447
See application file for complete search history.

(56) References Cited

U.S. PATENT DOCUMENTS

| | | | | | |
|---|---|---|---|---|---|
| 5,520,231 | A | * | 5/1996 | Myatt ....................... | 152/152.1 |
| 5,864,056 | A | * | 1/1999 | Bell et al. ..................... | 73/146 |
| 6,666,079 | B2 | * | 12/2003 | Poulbot et al. ................. | 73/146 |
| 7,284,417 | B2 | * | 10/2007 | Reynolds .................... | 73/146.5 |
| 7,385,492 | B2 | * | 6/2008 | Hattori ........................ | 340/442 |
| 7,404,318 | B2 | * | 7/2008 | Merino-Lopez et al. ....... | 73/146 |
| 7,404,319 | B2 | * | 7/2008 | Poulbot et al. ............. | 73/146.5 |
| 7,406,876 | B2 | * | 8/2008 | Krozer et al. ................. | 73/777 |

* cited by examiner

*Primary Examiner*—Andre J Allen
*Assistant Examiner*—Jermaine Jenkins
(74) *Attorney, Agent, or Firm*—Sughrue Mion, PLLC

(57) ABSTRACT

A method for estimating accurately and stably the change of forces exerted on the tire or change of contact condition with the ground of the tire and an apparatus for putting it in operation.

Prepare a tire with sensors disposed therein such that the first and the second deformation amount measurement means 11A and 11B positioned on the vehicle body side and on outside, respectively, each of which comprises a lengthy detection portion 11a made of a conductive rubber member buried in the tire tread 21 and placed in a circumferential direction of the tire and comprises of detection electrodes 11b, 11b at both ends of the detection portion; and upon computing contact length with the ground of the tire vehicle body side and on the outside, from detected resistance value of the detection portion 11a included in the means of 11A and the wheel speed and from the resistance value of 11a included in the means of 11A and the wheel speed and from the resistance value of 11a included in the means 11B and the wheel speed, respectively, the load exerted on the tire and the lateral force exerted on the tire can be estimated form the average value and the difference value, respectively of the contact length on the vehicle body side and on the outside, respectively.

11 Claims, 4 Drawing Sheets

METHOD FOR ESTIMATING A TIRE RUNNING CONDITION AND AN APPARATUS FOR EFFECTING THE METHOD AND A TIRE WITH SENSORS DISPOSED THEREIN

BACKGROUND OF THE INVENTION

1. Field of the Invention

The present invention relates to a method for estimating a force exerted on a tire or estimating change of a condition of contact with a ground of a tire (hereinafter, referred to contact condition of a tire) exhibited at the time when a running state of a vehicle is changed and an apparatus for putting the method into operation and also relates to the tire with sensors disposed therein.

2. Description of the Related Art

In order to improve a running stability of a vehicle, it is required to feedback forces generated on the tire (generating motive force in tire) such as a load, lateral force or longitudinal force upon estimating them accurately. Relying on the information concerned with those load and forces, it has been considered that improvement in the stability would be further enhanced in view of feasibility of realization of apparatus for controlling the vehicle attitude in a high technical level such as ABS brake and application thereof.

Hitherto, as a method for estimating the force produced in the tire, the tire sensor has been considered and a couple of methods have been proposed. One of them is exemplified by FIG. 8, (a) and (b) such that the deformation amount produced in the inner liner portion 52 is measured by sensor 53 such as strain gauge for measuring the deformation amount disposed at at least two positions, and from those measured deformation amount, the dynamic condition of the tire, which is exhibited at the time when a load, lateral force or longitudinal force is exerted on the tire, is estimated. Also, a method for obtaining a force of contact with a ground of the tire (hereinafter referred as a contact force of a tire) has been proposed. Namely, the sensor is provided with a pressure sensitive electrical conductive rubber and a DC power source connected in series therewith and the contact force of the tire can be obtained from the change of the resistance value of the conductive rubber caused by the force exerted vertically on the block portion exhibited at the time when the tire contacts with the ground (for example, see patent documents 1 and 2).

On the other hand, a magnetic tire can be used and this tire is provided with many bands of magnetic poles with those poles alternatively changeably positioned formed by magnetizing the magnetizable minute particles mixed into the rubber of tire. The magnetic signature of tire is obtained through the SWT system (torsion measuring system provided in the wall side). The SWT system is located on the portion facing the tire side portion of the suspension strut and is employed for detecting the magnetic field produced by the magnetic tire so as to obtain the magnetic signature. The condition under subjected to damage can be judged by comparing with the foregoing magnetic signature with undamaged one as disclosed by, for example, the patent documents as undergiven.

1 [Patent Document 1] Japanese Laid Open Patent Application No. 2005-343281

2 [Patent Document 2] Japanese Laid Open Patent Application No. 2005-82010

3 [Patent Document 3] Japanese Laid Open Patent Application No. 2005-522680

SUMMARY OF THE INVENTION

However, the foregoing sensor such as strain sensor and the one using the pressure sensitive rubber can catch the change appearing only at the time when the sensor comes to the position at which the sensor contacts with the ground. Thus, the chance available for obtaining the physical amount can be only once for one revolution of the tire. To overcome this difficulty, usually a plurality of foregoing sensors were provided through one round of tire, and yet because of sensors being positioned discretely through one round of the tire, when the vehicle runs on an undulating road, period of output of a sensor, such as a strain sensor or an acceleration sensor becomes discontinuous and thus there has arisen a problem as to reduction in sampling rate. In other words, since the period of sensor output is proportional to vehicle speed and spacing between sensors disposed circumferentially on the tire (length of one round of tire/number of sensors), especially at a time when the vehicle is running at a low speed, the period is obliged to exceed 0.2 sec the sensors as above hardly can be adapted to a vehicle control system requiring a high speed sampling such as the brake by wire.

On the other hand, though the SWT system is capable of providing a continuous output, the system has difficulty in obtaining behavior of a contact patch of the tire.

An apparatus including a sensor capable of providing output continuously is, for example, a six-components detector using strain gauge. However, in order to expect an accurate estimation of the load Fz, not only the six-components detector is required to measure the rotational angle of the tire accurately, but also an accurate positioning of the strain gauge is required for mounting the gauge, as a result, highly costed expenditure is required for employment of such a detector. Thus, the apparatus is valuable as a measurement apparatus but not practical to be used on board the vehicle.

The present invention is made to solve the problems mentioned as above and its object is to provide the method for judging accurately and stably the force exerted on the tire and the contact condition of the tire under the running state and also to provide the tire with the sensors disposed therein.

As a result of enthusiastic studies by the inventors, the present invention has been reached. Namely, the inventors found the fact that by detecting the total amount of the deformation of tire by means of a lengthy sensor disposed in the tire including the tire tread surface or on the surface of a part of the inner liner continuously in a circumferential direction of the tire, though the total amount of the deformation of tire does not change under the straight running, the amount does change under the condition of being subjected to a change in vehicle running state such as changing from straight running to slalom or slalom to straight running; based on such a change in total amount of deformation caused by change of running state, an accurate estimation of the force exerted on the tire or on that of contact condition of the tire can be made by detecting the total amount of deformation of the tire and from this fact found by the inventors, the present invention has been reached.

Thus, the invention as set forth by claim 1 provides the method for estimating the condition of tire under running state of a vehicle such that a lengthy sensor extending in a circumferential direction of the tire is disposed in the tire including the tread surface or on a surface of a part of the inner liner, at least a part of which is deformed at the time when the tire contacts with the ground and a total amount of the deformation exhibited at an area extending over a predetermined length in a circumferential direction of the tire is detected so as to estimate a force exerted on the or a contact condition of the tire.

The invention according to claim 2 provides the tire with a sensor disposed therein for estimating a condition of the tire under running state, wherein the tire includes therein a lengthy sensor disposed in the tire including the tread surface or on the surface of a part of an inner liner of the tire, at least a portion of the sensor is deformed at the time when the tire contacts with the ground and also electrodes for detection attached to the sensor.

The invention according to claim 3 provides the tire with a sensor disposed therein according to claim 2 in which length of the sensor is made longer than the contact length of the tire.

The invention according to claim 4 providing the tire with a sensor disposed therein according to claim 2 in which electrodes for detection are provided at circumferential end portions of the sensor.

The invention according to claim 5 provides the tire with a sensor disposed therein according to claim 4 in which an insulating member having higher insulation resistance value than that of the rubber surrounding the electrode portions or electrodes is interposed therebetween.

The invention according to claim 6 provides the tire with a sensor disposed therein according to claim 2 in which the sensor comprising an insulation rubber and circumference of the sensor is covered by an insulation member having a resistance value higher than that of the conductive rubber.

The invention according to claim 7 provides the tire with a sensor disposed therein according to claim 6 in which the insulation member comprising a insulation rubber having a resistance value more than ten times the resistance value of the conductive rubber sensor.

The invention according to claim 8 provides the tire with a sensor disposed therein according to claim 2 in which the sensors are positioned on the vehicle body side and on the outside, respectively under the condition of the tire being fit to a wheel having been put on the vehicle.

The invention according to claim 9 provides the apparatus for estimating condition of a tire under running state, comprises a lengthy sensor which is disposed in the tire including the tread surface or on a surface of a part of the inner liner of the tire extending in a circumferential direction of the tire, at least a portion of which is deformed at the time when the tire contacts with the ground, the tire deformation amount detection means for detecting from output of the sensor a total amount of deformation exhibited on an area extending over a predetermined length in a circumferential direction of the tire, and the tire running condition estimation means for estimating a force exerted on the tire or a contact condition of the tire based on the output from the tire deformation amount detection means.

The invention according to claim 10 provides the apparatus for estimating condition of a tire under running state according to claim 9 in which a wheel speed sensor is further provided, and the apparatus comprises a means for estimating a contact length of the tire based on the wheel speed detected by the wheel speed sensor and the output of the lengthy sensor.

The invention according to claim 11 provides the apparatus for estimating running condition of the tire according to claim 10 in which the sensors are positioned on the vehicle body side and on the outside, respectively under the condition of the tire being fit to a wheel having been put on the vehicle and the apparatus comprises a means for estimating an average contact length of the tire based on the sum of outputs of the wheel speed sensor and the lengthy sensors.

The invention according to claim 12 provides the apparatus for estimating a condition of the tire under running state according to claim 10 in which the sensors are positioned on the vehicle body side and the outside, respectively under the condition of the tire fit to a wheel having been put on the vehicle, and the apparatus comprises a means for estimating a difference value between the contact length of the vehicle on the vehicle body side and the one on the outside, respectively and a means for estimating a lateral force input to the tire from the estimated difference value of the contact length of the tire.

EFFECT OF THE INVENTION

According to the present invention, a force exerted on the tire or the contact condition of the tire under running state can be estimated by detecting the total sum of the amount of the deformation exhibited on the area extending over a predetermined length in a circumferential direction of tire by means of a lengthy sensor disposed in the tire including the tread surface or on a surface of a part of the inner liner of the tire. The lengthy sensor is adapted deformably at the time when the tire contacts with the ground and also provided with the electrodes for detection attached to the sensor. As a result, running condition of the tire can be estimated accurately.

In this regard, by making the length of the sensor longer than the contact length of the tire, for example, making the length longer approximately than the length of one round of the tire, the estimation accuracy will be further improved.

Also, by providing the electrodes for detection at a circumferential end portions of the sensor and by interposing a member having a higher insulation resistance than that of the surrounding rubber member between the electrode portions for detection or electrodes for detection, the sensor will be less affected by the surrounding members and the estimation accuracy of the deformation amount of the tire will be improved further.

Also, by making the sensor comprising a conductive rubber and by covering the circumference of an insulation member having a resistance value higher than the value of ten times the resistance of the conductive rubber, even a simplified constitution can estimate deformation amount of tire accurately.

Further, by placing the sensors on the vehicle body side and on the outside, respectively under the condition of the tire being fit to the wheel having been put on the vehicle, not only the deformation amount of the tire but also the load and the lateral force exerted on the tire can be estimated accurately.

BRIEF DESCRIPTIONS OF THE DRAWINGS

FIG. 1 is a fundamental block diagram showing a constitution of the tire running condition estimation apparatus drawn from the best mode Embodiment.

FIG. 2(a), (b) are schematic diagrams of the tire with sensors disposed therein of the present invention.

Figure 8A:
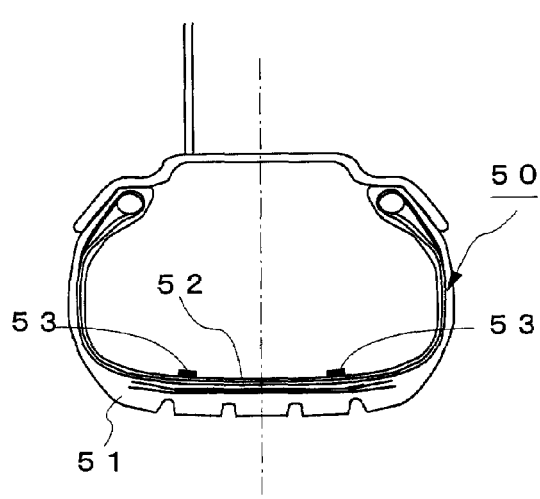
Figure 8B:
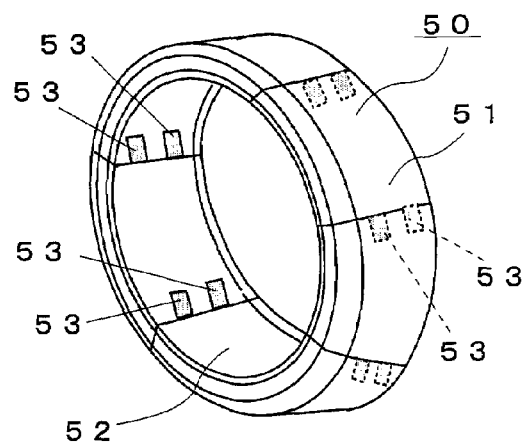

FIG. 8(a), (b) are schematic diagrams showing a constitution of a tire with sensors dispose therein.

DESCRIPTION OF THE PREFERRED EMBODIMENT

Hereinafter, a description will be given on the best mode embodiment of the present invention with reference to the accompanied drawings.

Figure 1:
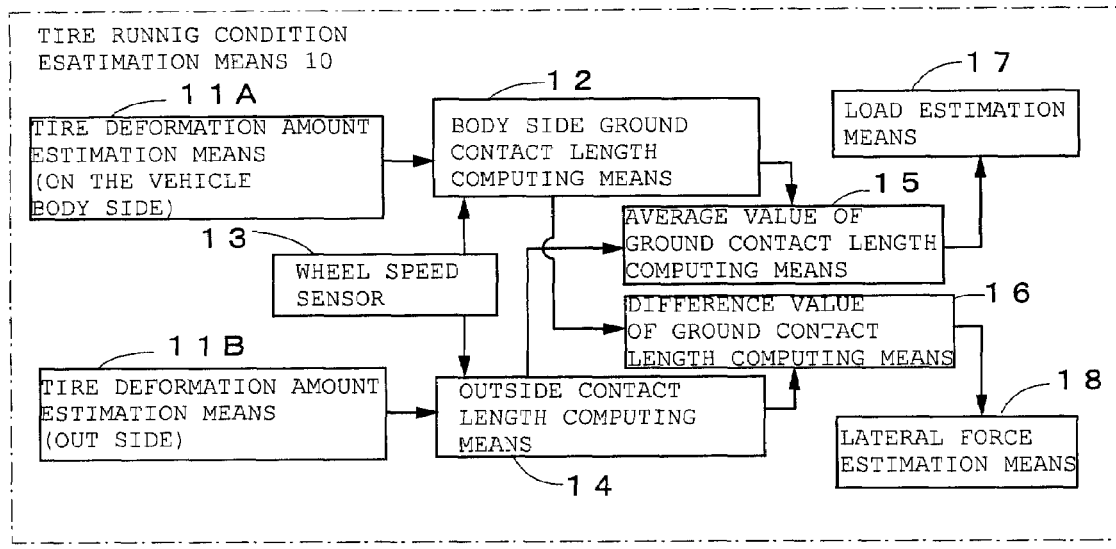

FIG. 1 is a block diagram showing a constitution of the tire running condition estimation apparatus 10 drawn from the best mode embodiment.

Figure 2A:
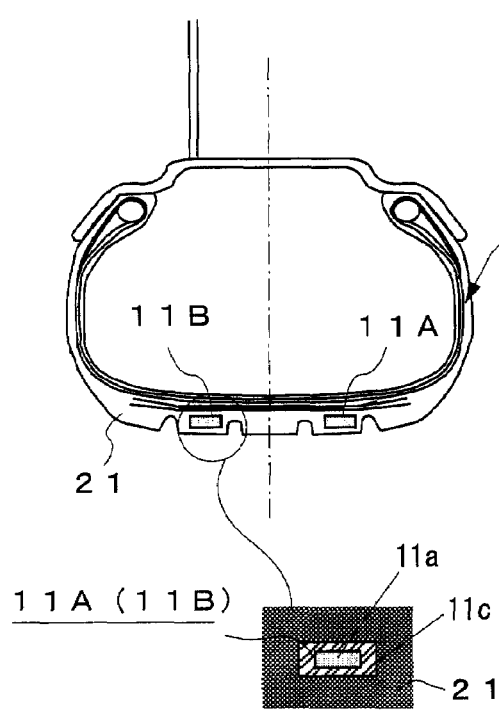
Figure 2B:
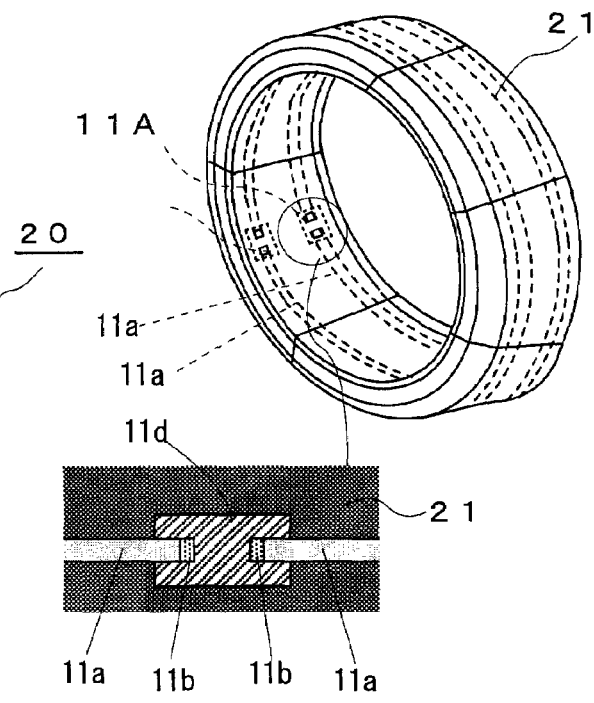

FIG. 2(a) and (b) are schematic diagrams showing the tire 20 with the sensor disposed therein of the present invention. In respective drawings, the numerals 11A and 11B denote the first and second means for estimating total amount of the deformation of the tire tread being buried therein in a circumferential direction of the tire and being positioned on the vehicle body side and on the outside, respectively under the condition of the tire being fit to the wheel having been put on the vehicle. The tire deformation amount estimation means 11A and 11B are positioned on the vehicle body side and on the outside, respectively of the tire 20 and each of the estimation means 11A and 11B is a lengthy and continuously formed sensor covering the length more than 99% of one round length of the tire comprising detection portion 11a comprising a conductive rubber member and the detection electrodes 11b, 11b being disposed at a circumferential end portions of the sensor.

The numeral 12 denotes the means for computing the contact length of the tire 20 on the vehicle body side based on the output of the wheel speed sensor 13 and the output of the first tire deformation amount estimation means 11A; the numeral 14 denotes the means for computing the contact length of the tire 20 on the outside based on the output of the wheel speed sensor 13 and that of the output of the second tire deformation amount estimation means 11B; the numeral 15 denotes the means for computing the average contact length of the tire 20 based on the contact length of the tire 20 on the vehicle body side and the one on the outside computed by means 12 for computing the contact length of the tire on the vehicle body side and means 14 for computing the same on the out side. The numeral 16 denotes the means for computing difference length between the length appearing on the vehicle body side and the one appearing on the outside; the numeral 17 denotes the load estimation means for estimating the load Fz exerted on the tire from the average contact length computed as above; the numeral 18 denotes the means for estimating the lateral force Fy exerted on the tire from the difference contact length computed as above.

In this example, circumference of the detection portion 11a included in the first and second tire deformation amount computing means 11A and 11B is covered by an insulation rubber 11C having a resistance value higher than that of the conductive rubber constituting the detection portion 11a such as silica rich rubber (Si/(CB+SI)>0.7) so as to insulate the detection portion 11a from the surrounding rubber and also an insulation material 11a having higher resistance value than that of the rubber surrounding the electrodes is interposed between the detection electrodes 11b and 11b. By this arrangement, the detection portions 11a, detection electrodes 11b, 11b and parts of the tire such as surrounding rubber members and the steel cord can be insulated certainly and as a result, accurate detection of the change of the conductive rubber can be made. In this instance, the silica rich rubber, which is the same material with the one used for the insulation member 11C, can be used as the constituent of the insulation rubber 11C. Also, the tire deformation amount computing means 11A and 11B can be disposed therein during the molding process of the tire.

Figure 3:
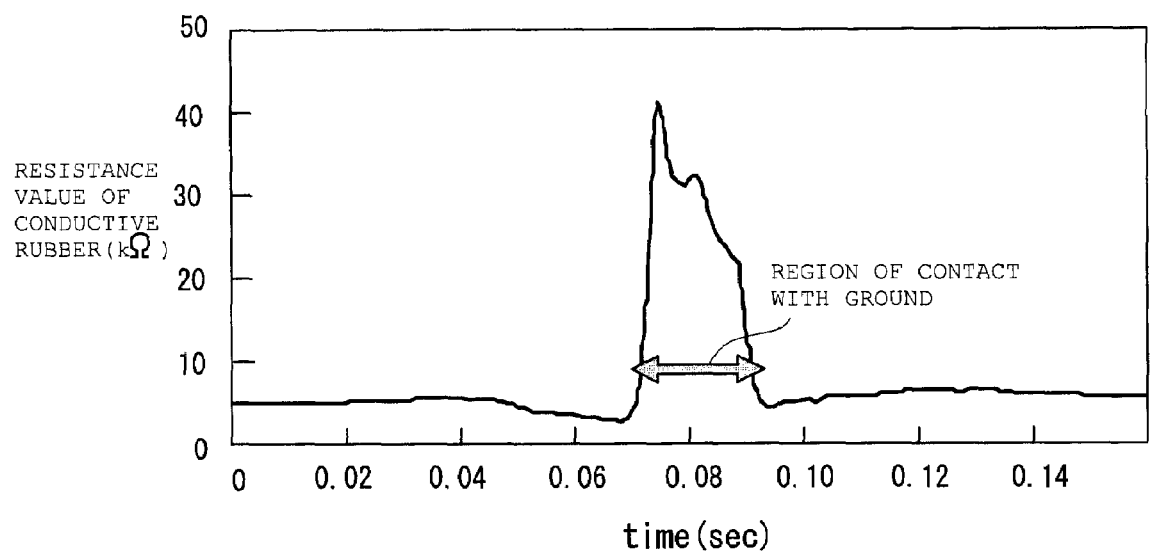
FIG. 3 shows change of the resistance of a conductive rubber member with respect to tire (tire varying change of resistance).

FIG. 3 shows the time varying resistance value ("Time varying resistance value" is meant by "change of resistance value with respect to time") of the conductive rubber through one round of the tire obtained from the rubber having a length considerably shorter than the one round length of the tire, and when the portion of the tire tread, at which the conductive rubber is buried therein, contacts with the ground, the resistance value is increased by the tension accompanied to the deformation of the tire.

Since the length of the conductive rubber member constituting the detection portion 11a of the tire deformation amount computing means 11A and 11B is longer than 99% of the one round length of the tire as above mentioned, the resistance value appearing between the electrodes 11b, 11b can be reduced to the value obtained through integrating the wave form of the resistance value with respect to time as shown by FIG. 3. In other words, the detected resistance value becomes the total sum of the deformation value encompassing one round of the tire. Accordingly, when a vehicle is running straightly, condition of the tire 20 such as magnitude of the contact length and that of load will not be changed and then the resistance value as above remains unchanged.

On the other hand, when the vehicle is running under slalom, the above resistance value changes correspondingly to the running condition of the vehicle, which is caused by the change in the contact pressure exerted on the tire and that of the contact configuration of the tire.

Figure 4:
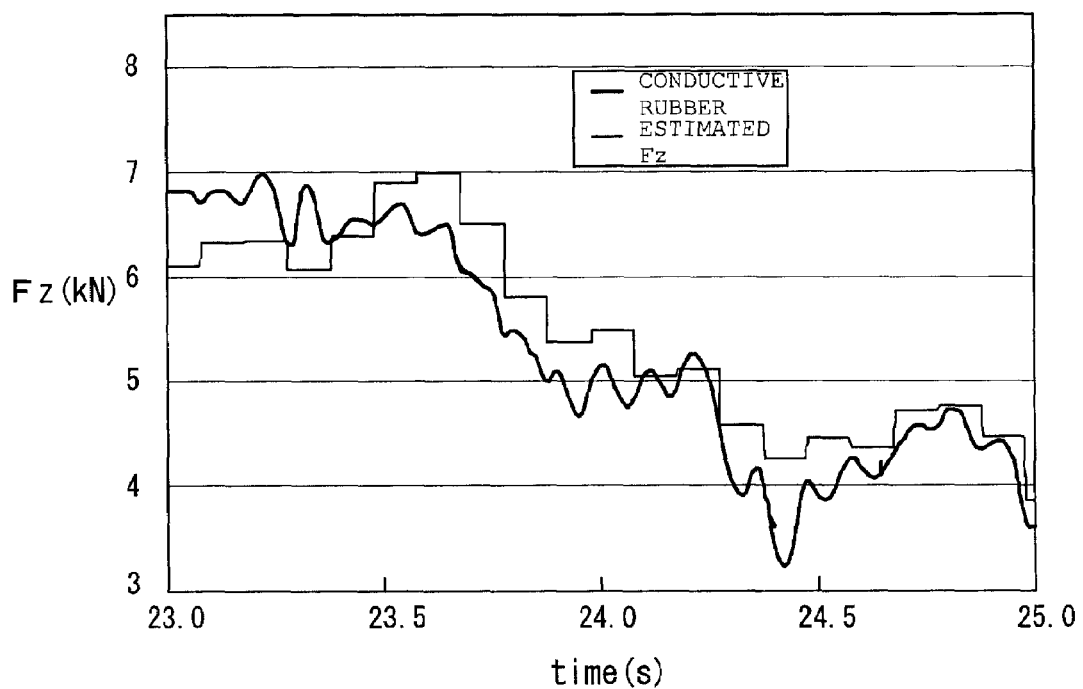
FIG. 4 shows a comparison between a time varying output of a conventional tire with sensors disposed therein with that of the lengthy conductive rubber member of the present invention.
Figure 5:
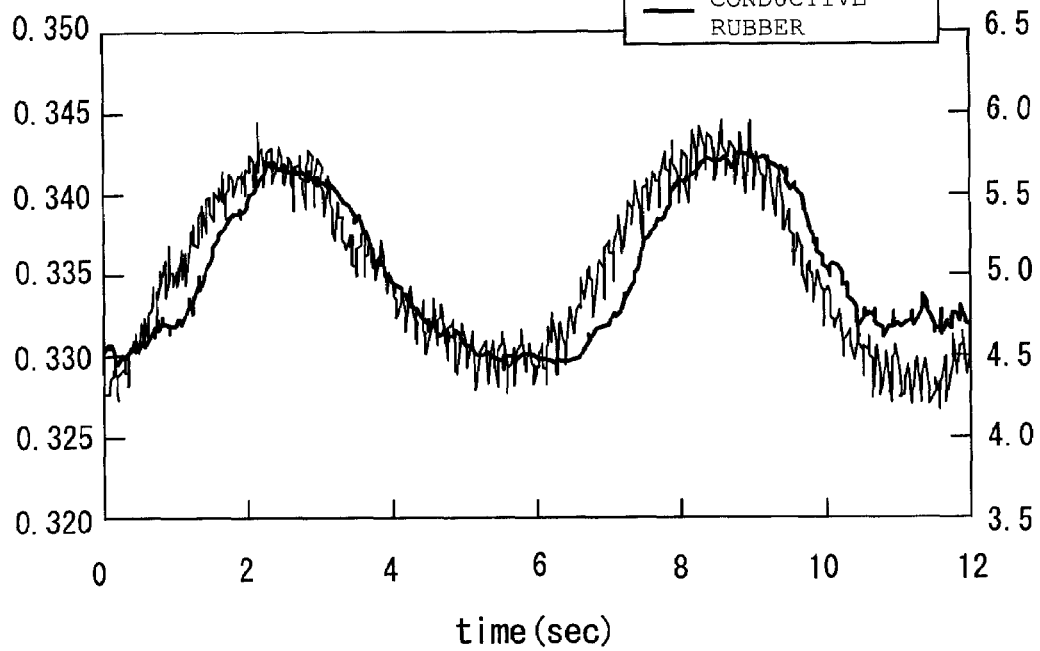
FIG. 5 shows a comparison between output of the lengthy conductive rubber member of the present invention with that of a six components device.

FIG. 4 shows the time varying estimated load Fz obtained through discretely poisoned conventional sensors in a circumferential direction of the tire and obtained through the time varying resistance value of the lengthy conductive rubber of the present invention. As shown by FIG. 4, the conventional method, because of discretely performed detections, can not provide a response fully responsible to a fast input caused by running on uneven road surface with concave and convex or caused by lane change. In contrast with the conventional one, the lengthy conductive rubber of the present invention provides continuously changing resistance value. Furthermore, as shown FIG. 5, the time varying resistance value of the above conducive rubber exhibits all most the same line with the time variation of the load measured by the six component detector, which is a highly accurate measurement device, and therefore, by utilizing the lengthy conductive rubber as a sensor, not only the detection of the contact ground pressure exerted on the tire can be performed continuously but also the improvement of detection accuracy will be enhanced considerably.

In this example detection of resistance value is carried out on each of the first and second tire deformation amount computing means 11A and 11B; and from those detected resistance values and the wheel speed, the respective contact lengthy on the vehicle body side and on the outside are obtained; and from the above contact length of the vehicle body side and that of the outside, the load Fz and the lateral force Fy exerted on the tire are estimated.

Figure 6:
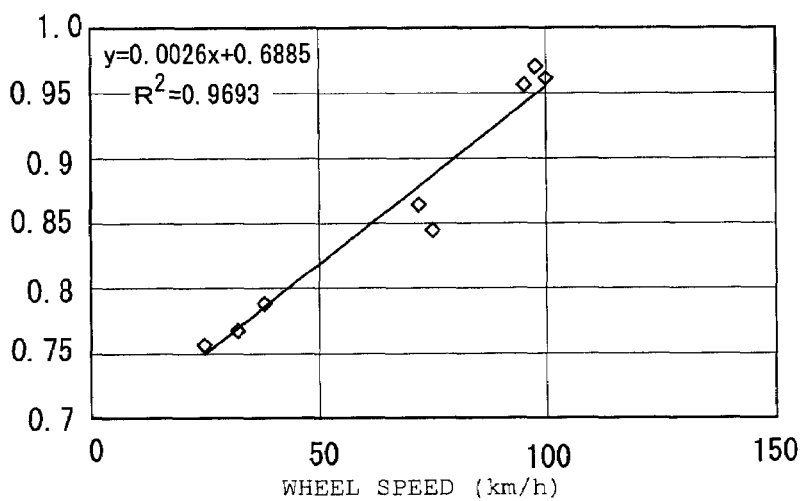
FIG. 6 shows a relation between output of the lengthy conductive rubber member of the present invention and wheel speed.

Since the tire contact length is the one which is obtained by multiplication of the angle of the leading edge exhibited through one revolution of the tire by its diameter, as shown by FIG. 6, resistance value of the conductive rubber member increases as the wheel speed increases. Accordingly, the contact length computing means on the vehicle body side 12 and the one on the outside 14 compute the contact length on the vehicle body side and the one on the outside, respectively upon incorporating compensation of the outputs from the first and the second tire deformation value measurement means 11A and 11B, respectively for above values. Since the load Fz exerted on the tire increases as the tire contact length increases, the load Fz can be estimated accurately from the average values of the contact length on the vehicle body side and on the outside by means of the average contact length computing means 15.

Also, when the cornering force is acted on the tire during running, the contact length of the leading edge differs between the one on the vehicle body side and the one on the outside depending on the magnitude of the cornering force. When the slip angle is small, the cornering force is approximately same to the lateral force and hence the lateral force Fy exerted on the tire can be also estimated accurately by obtaining the difference of the contact lengths appearing between the one on the vehicle body side and the one on the outside through the contact length difference computing means 16.

Thus, the tire running condition estimation means 10 enables continuous detection of the load Fz and the lateral force Fy. Also, by virtue of high S/N ratio, accurate estimation of change of forces exerted on the tire and that of contact condition of the tire are feasible and since the sampling time can be shortened, application to a vehicle control apparatus requiring a fast sampling operation can be available.

In this manner, according to the embodiment of the best mode, the tire with the sensors disposed therein comprises the first tire deformation amount computing means and the second tire deformation amount computing means each of which is provided with the detection portion 11a and the electrodes for detection 11b, 11b. The detection portion 11a comprises a conductive rubber member buried in the tire tread 21 arranged in a circumferential direction of the tire located on both of the vehicle body side and outside, and the electrodes for detection are provided at circumferential ends of the detection portion 11a.

After fitting the tire 20 with the sensors disposed therein to the wheel having been put on a vehicle, resistance values of the detection portions under running state are detected; the contact length on the vehicle body side and the one on the outside are computed from the detected resistance values and the wheel speed; and thereafter the load Fz exerted on the tire is estimated from the average value of the contact lengths on the vehicle body side and on the outside; and the lateral force Fy exerted on the tire is estimated from the difference between the contact length on the vehicle body side and the one on the outside, and by virtue of the above arrangement, the forces exerted on the tire and the contact condition of the tire can be estimated continuously and accurately. As a result of the foregoing, the sampling time can be shortened and therefore, upon applying the running condition estimation apparatus 10 to a vehicle control apparatus requiring fast sampling, the tire running condition such as change of load exerted on the tire can be estimated accurately, thereby improving further control of characteristics such as vehicle attitude control as well as safety in operation.

Furthermore, in the tire 20 with sensor disposed therein, the circumference of the detection portion 11a is covered by an insulation rubber and the insulation detection portion 11a and the electrodes for detection 11b, 11b are insulated from environmental tire parts by interposing an insulation member 11a having higher resistance value than the environmental rubber between the electrodes 11b, 11b so as to insulate the detection portion 11a and the electrodes 11b, 11b for detection from the tire parts, and as a result, change of the resistance value of the conductive rubber member can be detected accurately.

In the above best mode embodiment, estimation of the load Fz is made upon obtaining the contact lengths of the tire 20 on the vehicle body side and on the outside from the resistance values of the respective rubber members included in the first and second tire deformation amount computing means 11A and 11B and from the wheel speed. However, for the estimation of the load only, or the contact length only, a single tire deformation amount measurement means having the same constitution with the first or second tire deformation amount measurement means 11A or 11B can be placed along a circumferential line passing through a widthwise midpoint of the tire, and from the resistance value of the conductive rubber member of the above means and from the wheel speed, the load or the contact length can be computed.

As a result of the above arrangement, even a simplified constitution suffices accurately and continuously performed estimation of the change of the contact condition of the tire.

To the contrary, the tire deformation measurement means can be employed as many as three or more than three. For example, in addition to the first and second tire deformation measurement means 11A and 11B, additional one can be placed passing through widthwise midpoint of the tire. By this arrangement, the contact length of the tire 20 can be detected more accurately, thereby improving further the accuracy of the estimation of the contact condition of the tire.

In the above example, the conductive rubber is buried in the tire tread covering the length of approximately one round of the tire, which is denoted as the detection portion 11a, and yet, instead of the above conductive rubber member, the conductive elastomer, such as conductive plastic can be used. Further, other sensors such as a lengthy piezo-electric sensor such as piezo electric wire, PVDF, PZT, PVC, etc. can be used and use of those sensors can produce the same effects with those use of the conductive rubber.

The first and the second tire deformation amount measurement means are not confined to be disposed in the tire tread 21, instead can be disposed on a surface of the tire tread 21. And further, they can be disposed on the shoulder side or beedfiller and sill can be affixed to a surface of a part of the inner liner. In order to measure the total amount of the deformation of the tire tread, it is essential to make the detection portion 11a longer than that of the contact length of the tire. Especially, it is preferable to make the length of the detection portion 11a longer than 99% of one round length of the tire as given by the example.

Figure 7A:
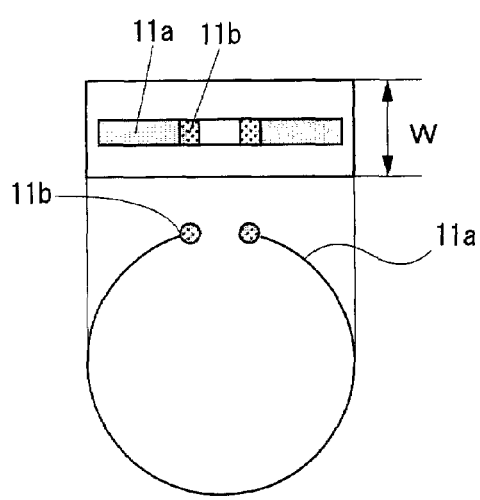
FIG. 7 shows an example of arrangement of electrodes for detection.
Figure 7B:
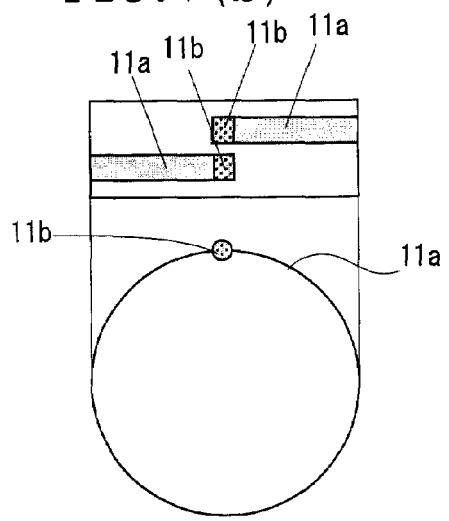

In the above example, two electrodes for detection 11b, 11b are disposed so as to face each other as shown by FIG. 7(a). However, as shown by FIG. 7(b) those two electrodes 11b, 11b can be placed so as to face each other at their sides upon shifting their positions width wisely. In this arrangement, the detection portion 11a is obliged to be deviated with an angle with respect to the circumferential direction of the tire, and yet this deviation does not raise a problem about the detection of the change resistance value.

INDUSTRIAL FEASIBILITY

As mentioned above, since the present invention enables to estimate change of the forces exerted on the tire or that of condition of contact with the road of the tire accurately and stably, by feedbacking above information to the vehicle control, the running stability of the vehicle can be improved extraordinarily.

What is claimed is:

1. A method for estimating a running condition of a tire comprising steps of, disposing lengthy and continuously formed sensors having a length of one round coverage of the tire, extending in a circumferential direction of the tire being disposed within the tire including the tread surface or on a surface of a part of an inner liner of the tire, at least a portion of the sensor being deformed at the time when the tire contacts with a ground, detecting a total amount of deformation exhibited in the circumferential direction of the tire, whereby estimating a forces exerted on the tire or a condition of contact with the ground of the tire.

2. A tire including therein lengthy and continuously formed sensors having a length of one round of coverage of the tire, extending in a circumferential direction of the tire being disposed within the tire including the tread surface or on a surface of a part of an inner liner of the tire, at least a part of the sensor is deformed at the time when the tire contacts with ground and, electrodes for detection being provided in the sensor.

3. The tire with the sensor disposed therein according to claim 2, wherein the electrodes for detection are disposed at circumferential end portions of the sensor.

4. A tire including therein:

a lengthy sensor disposed within the tire including the tread surface on a surface of a part of an inner liner of the tire, at least a part of the sensor is deformed at the time when the tire contacts with ground and, electrodes for detection being provided in the sensor, wherein an insulating member having higher insulation resistance value than the value of the rubber surrounding the insulation member is interposed between electrode portions for detection or between the electrodes for detection.

5. A tire including therein:

a lengthy sensor disposed within the tire including the tread surface on a surface of a part of an inner liner of the tire, at least a part of the sensor is deformed at the time when the tire contacts with ground and, electrodes for detection being provided in the sensor, wherein the sensor comprising a conductive rubber and circumference of the sensor is covered by an insulating member having a resistance value higher than that of the conductive rubber.

6. The tire with the sensor disposed therein according to claim 5, wherein the insulation member comprising the insulation rubber having insulation resistance value more than ten times the resistance value of the conductive rubber member of the sensor.

7. The tire with the sensor disposed therein according to claim 2, wherein the sensors are positioned on a vehicle body side and on an outside, respectively under the condition of the tire being fit to a wheel having been put on the vehicle.

8. An apparatus for estimating condition of a tire under running state comprising, lengthy and continuously formed sensors having a length of one round coverage of the tire disposed within the tire including the tread surface or on a surface of a part of an inner liner of the tire, extending in a circumferential direction of the tire, at least a portion of the sensor being deformed at the time when the tire contacts with the ground, a tire deformation amount detection means for detecting from an output of the sensors, a total amount of deformation exhibited in the circumferential direction of the tire and, a tire running condition estimation means for estimating forces exerted on the tire or condition of contact with the ground of the tire based on the tire deformation amount detection means.

9. The apparatus for estimating condition of the tire under running state according to claim 8, wherein a wheel speed sensor is further provided, and the apparatus comprises a means for estimating a length of contact with the ground of the tire based on the wheel speed detected by the wheel speed sensor and the out put from the lengthy sensors.

10. The apparatus for estimating the running condition of the tire under the running state according to claim 9, wherein the sensors are disposed on a vehicle body side and on an outside, respectively under the condition of the tire being fit to the wheel having been put on the vehicle, the apparatus comprising, a means for estimating an average length of contact with the ground of the tire based on the sum of the outputs from the wheel speed sensor and from the lengthy sensor, and a means for estimating a load exerted on the tire from the estimated average value of the length of contact with the ground of the tire.

11. The apparatus for estimating condition of the tire under miming state according to claim 9, wherein the sensors are disposed on a vehicle body side and on an outside, respectively under the condition of the tire fit to the wheel having been put on the vehicle, the apparatus comprising, a means for estimating a difference value between the length of contact with the ground of the tire appearing on the vehicle body side and the one appearing on the outside, and a means for estimating a lateral force input to the tire from the difference value of the length of the contact with the ground of the tire.

* * * * *